United States Patent

Terada et al.

[11] Patent Number: 5,932,866
[45] Date of Patent: Aug. 3, 1999

[54] OPTICAL CARD WITH A BUILT-IN IC MODULE TECHNICAL FIELD

[75] Inventors: Yosuke Terada; Shigeo Hachiki; Hachiro Saito; Seiichi Nishikawa; Yoshihiro Azuma, all of Tokyo-To, Japan

[73] Assignee: Dai Nippon Printing Co., Ltd., Japan

[21] Appl. No.: 08/765,593

[22] PCT Filed: May 17, 1996

[86] PCT No.: PCT/JP96/01316

§ 371 Date: Dec. 19, 1996

§ 102(e) Date: Dec. 19, 1996

[87] PCT Pub. No.: WO96/36938

PCT Pub. Date: Nov. 21, 1996

[30] Foreign Application Priority Data

May 19, 1995 [JP] Japan .................................... 7-144169
Dec. 27, 1995 [JP] Japan .................................... 7-340654

[51] Int. Cl.⁶ .................................................. G06K 19/00
[52] U.S. Cl. ............................................ 235/487; 235/492
[58] Field of Search ..................................... 235/487, 492

[56] References Cited

FOREIGN PATENT DOCUMENTS

| 311435 | 4/1989 | European Pat. Off. . |
| 528275 | 2/1993 | European Pat. Off. . |
| 650143 | 4/1995 | European Pat. Off. . |
| 61-046576 | 3/1986 | Japan . |
| 61-125690 | 6/1986 | Japan . |
| 61-248184 | 11/1986 | Japan . |
| 63-237231 | 10/1988 | Japan . |
| 63-239092 | 10/1988 | Japan . |
| 7-160839 | 6/1995 | Japan . |
| 2095175 | 9/1982 | United Kingdom . |

OTHER PUBLICATIONS

Patent Abstracts of Japan, vol. 15, No. 178 (M–1110), May 8, 1991 & JP 03 042296 A (Ricoh Co Ltd), Feb. 22, 1991, Abstract.

Patent Abstracts of Japan, vol. 13, No. 40 (P–820), Jan. 30, 1989 & JP 63 237231 A (Hitachi Ltd), Oct. 3, 1988, Abstract.

*Primary Examiner*—Harold I. Pitts
*Attorney, Agent, or Firm*—Parkhurst & Wendel, L.L.P.

[57] ABSTRACT

An optical card (100) with a built-in IC module comprises a base card (101), an optical recording part (11) incorporated into the base card (101), and an IC module (120) mounted on the base card (101). The IC module (120) has a base (122), an IC chip unit (121) mounted on one of the surfaces of the base (122), and a terminal part (123) formed on the other surface of the base (122). The terminal part (123) is disposed in a region corresponding to the optical recording part (110) so as to be exposed to view. The IC chip unit (121) is disposed outside the region corresponding to the optical recording part (110).

15 Claims, 9 Drawing Sheets

OPTICAL CARD WITH A BUILT-IN IC MODULE TECHNICAL FIELD

TECHNICAL FIELD

The present invention relates to an optical card with built-in IC module, having a recording part of an optical recording system (hereinafter referred to as "optical recording part") and an IC module.

BACKGROUND ART

Information recording cards have become used prevalently in recent years, and active R&D activities have been made to develop optical cards having a large capacity which may replace magnetic cards and IC cards. There have been proposed what they call heat mode recording materials as optical recording materials for forming the recording layer of the optical card. The recording layer of a heat mode recording material is scanned with a spot of an energy beam, such as a laser beam, to change the state of portions thereof for recording. The heat mode recording material is a metal thin film, such as a bismuth thin film, an organic thin film, such as a polystyrene thin film or a nitrocellulose thin film, or a low-valence tellurium oxide film subject to phase transition when exposed to heat. Those optical recording materials do not need any subsequent treatment, such as a developing treatment, after information has been written thereto, and information written thereto can be verified after writing. An optical card provided with such an optical recording material is a DRAW (direct read after write) medium which is capable of high-density recording, has a large capacity and allows additional writing.

In the optical card having an optical recording part of such an optical recording material, information once written to the optical recording part cannot be changed. Therefore, a new storage area is used every time data to be successively changed, such as a directory of recorded data (retrieval information) or a FAT (file allocation table), is written to the optical recording part and thereby a data storage area available for storing essential data is reduced. With such a problem in view, there has been proposed an optical card with a built-in IC module formed by mounting an IC module having an IC chip on an optical card, and capable of storing data which is to be rewritten, such as a directory or a FAT, in the IC module.

When reading data from such an optical card with a built-in IC module, a host computer needs only to specify a file name, and a card drive makes a quick electrical access to the IC chip, retrieves a directory, and records a track number indicating a track on which the specified data file is written. Subsequently, an optical pickup makes an access to the track of the optical recording part to read the specified data file. If format is standardized, the optical card with a built-in IC module can freely be used in all network systems. Although the optical recording part is not rewritable, data which needs rewriting are recorded on the IC chip because the IC chip is relatively easily rewritable.

Generally, the optical card with a built-in IC module employs an IC chip with a built-in CPU combined with an IC memory. An IC module included in such an optical card with a built-in IC module has a base, an IC chip formed on the base, and a terminal part formed on the base. The terminals of the terminal part of the IC module are brought into contact with a contact head included in a read/write (R/W) device to connect the IC module electrically to the R/W device so that I/O lines are established. Information is read and written through the I/O lines. The internal CPU of the IC chip performs advanced decisions and operations to maintain the security of the information.

The optical card with a built-in IC module having the optical recording part and the IC module is thin and its thickness is standardized (0.76±0.08 mm, ISO Standards) and the optical recording part is required to be installed at a standard depth of 0.4±0.05 mm from the surface of the optical card. The R/W device for writing information to and reading information from the optical recording part is constructed so as to meet those standards. The horizontal position of the optical recording part with respect to the right side, the left side and the lower side of the optical card is specified in ISO Standards (ISO 11694-2). According to ISO Standards, the distances from the right and the left edge of the optical card to the ends of a region for the optical recording part must be 3 mm or less, and the distance from the lower edge of the optical card to the end of the same region must be 4.5 mm or less. Therefore, an area taken by the optical recording part needs to be expanded toward the upper edge of the optical card to increase the capacity of the optical recording part.

Thus, the region for the optical recording part needs to be expanded to a terminal region for the terminal part of the IC module specified in ISO Standards (ISO 7816-2) for IC modules, to increase the capacity of the optical recording part of the optical card with a built-in IC module. If the region for the optical recording part is expanded, the optical recording part and the IC module overlap each other and, since the thickness of the IC module is about 0.6 mm, the thickness of a contact region of the optical card increases beyond the standard thickness of 0.76±0.08 mm specified in ISO Standards, so that the IC module should not penetrate the optical recording film.

SUMMARY OF THE INVENTION

The present invention has been made in view of those problems and it is therefore an object of the present invention to provide an optical card with a built-in IC module, allowing effective increase in the capacity of an optical recording part to be employed therein and capable of suppressing increase in the thickness of its component optical card.

According to a first aspect of the present invention, an optical card with a built-in IC module comprises a base card, an optical recording part mounted on the base card, and an IC module mounted on the base card. The IC module includes a base, an IC chip unit attached to one surface of the base, and a terminal part formed on the other surface of the base. The terminal part of the IC module is disposed so as to be exposed to the outside, the IC chip unit is disposed in a region of the base card other than a region in which the optical recording part is disposed.

According to a second aspect of the present invention, the IC chip unit on one of the surfaces of the base, and the terminal part on the other surface of the base are disposed in regions of the base card not corresponding to each other.

According to a third aspect of the present invention, the area of the terminal part of the IC module is greater than that of the IC chip unit, and the IC chip unit is disposed within a region corresponding to the terminal part.

According to a fourth aspect of the present invention, the base of the IC module overlaps the region corresponding to the optical recording part, and a pair of opposite end edges of the base lie outside a region corresponding to the optical recording part.

According to a fifth aspect of the present invention, the base of the IC module overlaps a region corresponding to the optical recording part, an edge of the base extends linearly in a region corresponding to the optical recording part at a predetermined inclination to the direction in which tracks of the optical recording part extend.

According to a sixth aspect of the present invention, the base of the IC module overlaps a region corresponding to the optical recording part, edges of the base of the IC module overlap a region corresponding to the optical recording part, and an edge of the base extends curvilinearly in a region corresponding to the optical recording part.

According to a seventh aspect of the present invention, the base card includes a base plate for the terminal part, and a base plate for the optical recording part, and a covering layer of substantially the same color as that of the base plate for the terminal part is formed on the back surface of the IC chip unit of the IC module.

According to an eighth aspect of the present invention, the base card includes a base plate for the terminal part, and a base plate for the optical recording part, and the IC chip unit of the IC module includes an IC chip and a sealing resin molding for encapsulating the IC chip therein, and the color of the sealing resin molding is substantially the same as that of the base plate for the terminal part.

According to the first aspect of the present invention, as the optical card with a built-in IC module in accordance with the present invention has the IC chip unit disposed in the region outside the region in which the optical recording part is disposed, the region for the optical recording part can be expanded without entailing increase in the thickness of the base card.

According to the second aspect of the present invention, as the IC chip unit and the terminal part are disposed in regions other than the corresponding regions, the IC chip unit and the optical recording part can be disposed so as not to overlap each other with the terminal part disposed at a predetermined position.

According to the third aspect of the present invention, as the IC chip unit is disposed in a portion of the region corresponding to the terminal part, the IC chip unit and the optical recording part can be disposed so as not to overlap each other with the terminal part disposed at a predetermined position.

According to the fourth aspect of the present invention, as the pair of edges of the base lie outside the region corresponding to the optical recording part, the optical recording part will not be damaged even if stress is concentrated on portions in the vicinity of the pair of edges when the optical card is bent.

According to the fifth aspect of the present invention, as the edge of the base is extended at a predetermined inclination to the direction in which tracks of the optical recording part extend, the tracks of the optical recording part will not be damaged by stress concentration on portions in the vicinity of the edge even if stress is concentrated on portions in the vicinity of the edge of the base when the optical card is bent.

According to the sixth aspect of the present invention, as the edge of the base extends curvilinearly, the tracks of the optical recording part will not be damaged by stress concentration on portions in the vicinity of the edge even if stress is concentrated on portions in the vicinity of the edges of the base when the optical card is bent.

According to the seventh and the eighth aspect of the present invention, the back surface of the IC chip unit can be concealed by the covering layer or the sealing resin molding in the base plate for the terminal part from view when the optical card is observed from the side of the base plate for the optical recording part.

BEST MODE FOR CARRYING OUT THE INVENTION

First Embodiment

A first embodiment of the present invention will be described hereinafter with reference to the accompanying drawings. FIGS. 1A to 4B show an optical card with a built-in IC module in a first embodiment according to the present invention.

Figure 4A:
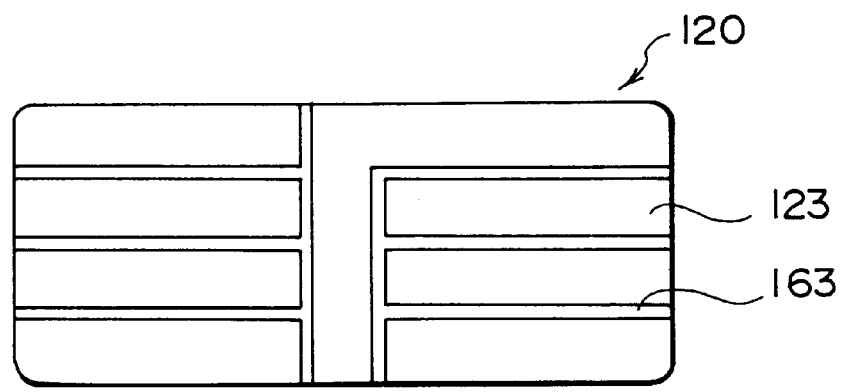
FIG. 4A is a plan view of a common IC module.
Figure 4B:
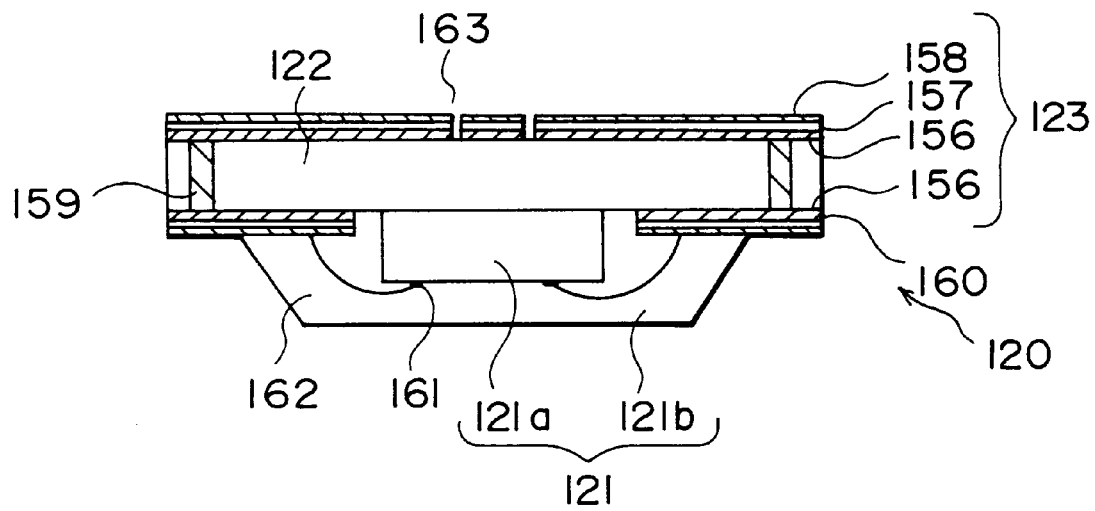
FIG. 4B is a sectional side view of the IC module of FIG. 4A.

A common IC module will be explained with reference to FIGS. 4A and 4B. Referring to FIGS. 4A and 4B, an IC module 120 has a base 122. An IC chip 121a including a CPU and a memory is mounted on a first surface of the base 122, the electrode pads 161 of the IC chip 121 are connected to a pattern layer formed on the first surface of the base 122 by wires 162, respectively. The IC chip 121a and the associated parts are sealed in a sealing resin molding 121b to form an IC chip unit 121. A terminal part 123 is formed on a second surface of he base 122 by a copper foil layer 156, a plated Ni layer 157, i.e., an underlayer, and a plated gold layer 158. The terminal part 123 is divided by isolation grooves 163 into a CLK (clock) terminal, an I/O terminal, a $V_{cc}$ (power) terminal, a RST (reset) terminal and GND (ground) terminal. The base 122 is provided with rough holes for electrically interconnecting a pattern layer 160 formed on the first surface of the base 122 and the terminal part 123 formed on the second surface of the base 122.

Figure 1A:
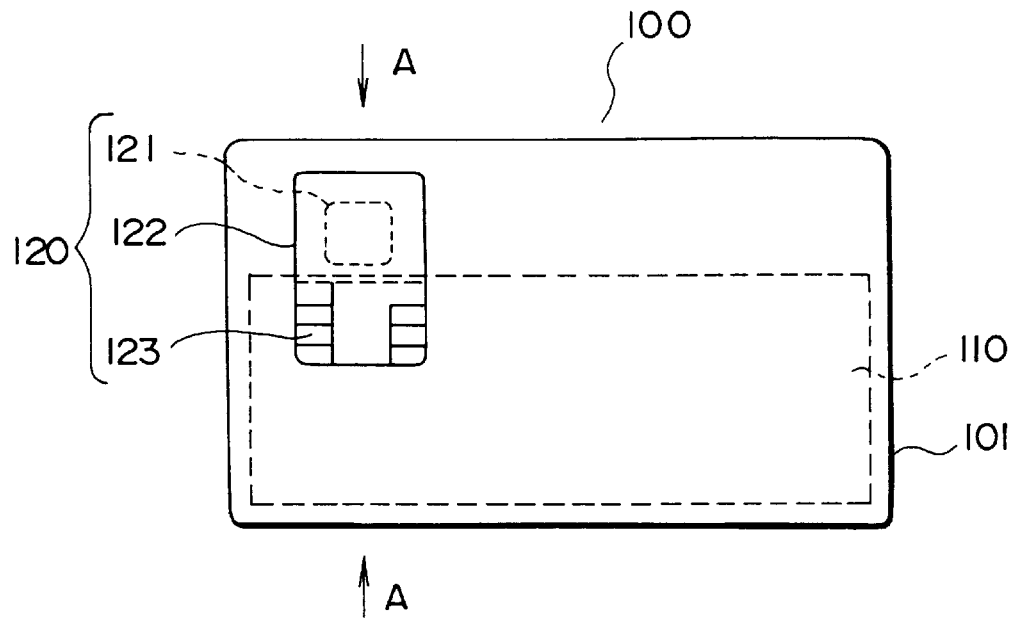
FIG. 1A is a plan view of an optical card with a built-in IC module in a first embodiment according to the present invention.
Figure 1B:
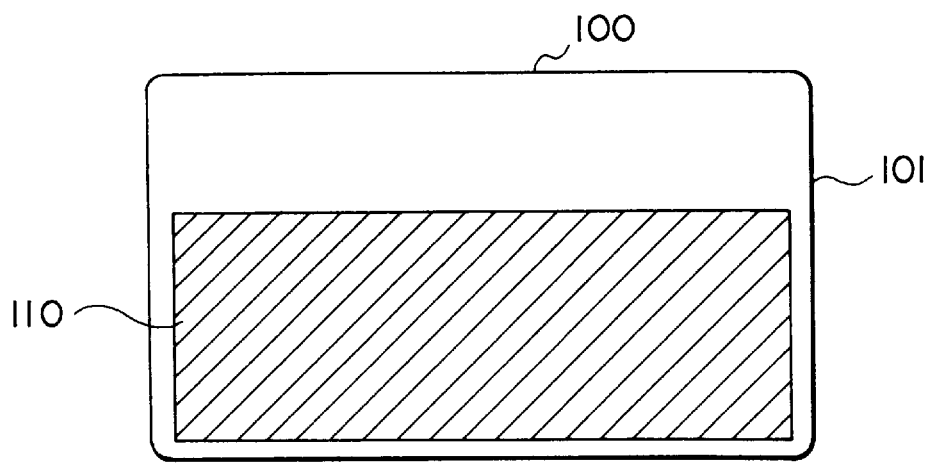
FIG. 1B is a rear view of the optical card with a built-in IC module of FIG. 1A.
Figure 1C:
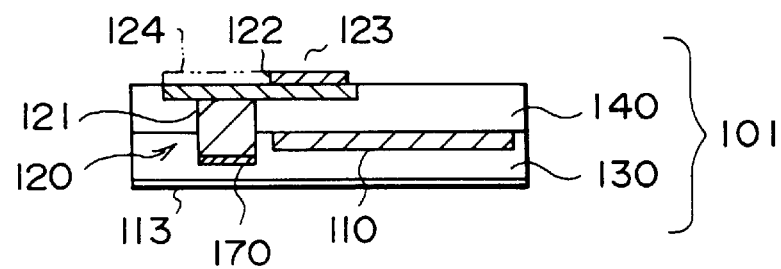
FIG. 1C is a sectional view taken on line A—A in FIG. 1A.

An optical card with a built-in IC module will be described with reference to FIGS. 1A to 1C. Referring to FIGS. 1A to 1C, an optical card 100 with built-in IC module comprises a base card 101 including a first base plate 130 and a second base plate 140, an optical recording part 110 formed in the base card 101, and an IC module 120.

As shown in FIGS. 1A to 1C, the IC module 120, similarly to the foregoing common IC module 120, has a base 122, an IC chip unit 121 mounted on a first surface of the base 122, and a terminal part 133 formed on a second surface of the base 122. The IC chip unit 121 includes an IC chip 121a and a sealing resin molding 121b. The IC chip unit 121 may comprises only the IC chip 121a.

The IC module 120 has a terminal part 123 disposed in a surface of the base card 101 so as to be exposed to view. The IC chip unit 121 and the terminal part 123 of the IC module 120 are disposed in different regions, respectively; that is, the IC chip unit 121 and the terminal part 123 are disposed substantially symmetrically with respect to the middle portion of the base 122 as shown in FIGS. 1A to 1C. The IC chip unit 121 is disposed on one side of the middle portion of the base 122 and the terminal part 123 is disposed on the other side of the middle portion of the base 122.

The IC chip unit 121 of the IC module 120 is disposed in a region outside the optical recording part 110, and the terminal part 123 is disposed in a region corresponding to the optical recording part 110.

The terminal part 123 formed on the base 122 is disposed at a predetermined position on the front surface of the optical card 100 with a built-in IC module so as to be connected to an external circuit (read/write device), i.e., a position in a terminal region specified in ISO Standards, and the IC chip unit 121 including the sealing resin molding 121b is disposed at a position in an upper portion of the optical card 100 spaced from the terminal part 123 as shown in FIG. 1A. The optical recording part 110 is disposed in a region in which the terminal part 123 is disposed and the IC chip unit 121 including the sealing resin molding 121b is not disposed.

As shown in FIG. 1C, the IC chip unit 121 of the IC module 120, including the sealing resin molding 121b is apart from the terminal unit 123. Since the IC chip unit 121 including the sealing resin molding 121b does not overlap the optical recording part 110, the base card 101 having the first base plate 130 and the second base plate 140 has a thickness equal to that of the base card of a conventional optical card and within the thickness range of 0.76±0.08 mm specified in ISO Standards.

In the optical card 100 with built-in IC module, the terminal part 123 of the IC module 120 can be disposed in the region specified in ISO Standards (ISO 7816-2), the base card 101 has a thickness within the thickness range of 0.76±0.08 mm specified in ISO Standards, and the optical recording part 110 can be expanded to the region for the terminal part specified in ISO Standards (ISO 11694-2).

In the conventional optical card with a built-in IC module, the IC chip unit 121 including the sealing resin molding 121b is disposed in a region corresponding to the terminal part 123 as shown in FIG. 4B. Therefore, if the optical recording part 110 is expanded to the terminal part 123 of the optical card 100, the IC chip unit 121 and the optical recording part 110 overlap each other and, consequently, the thickness of the base card 101 increases and is unable to meet the requirements of ISO Standards. A read/write device conforming to the requirements of ISO Standards is unable to deal with such an optical card having a base card not meeting the requirements of ISO Standards. The optical card 100 with built-in IC module of the present invention can be handled by a read/write device conforming to the requirements of ISO Standards.

The materials of the base card 101 will be explained hereinafter. The first base plate 130 and the second base plate 140 of the base card 101 are made of a polycarbonate resin and a polyvinyl chloride resin, respectively. The thickness of a portion of the first base plate 130 corresponding to an optical memory region 111a (FIG. 3) is 0.4±0.05 mm. The first base plate 130 does not have any optical strain and has a transmittance of 95% or above to light radiations of a wavelength in the range of 750 to 850 nm. Suitable materials other than the polycarbonate resin for forming the first base plate 130 are polystyrene resins, amorphous polyolefin resins, polyester resins, acrylic resins, polyvinyl chloride resins, epoxy resins and such.

Suitable materials other than the polyvinyl chloride resin for forming the second base plate 140 are ABS resins, polycarbonate resins and such.

The optical recording part 110 is formed by covering a rugged recess 111 having a rugged bottom surface with an optical recording layer 112 of a tellurium-base metallic optical recording material. The optical recording layer 112 may be formed of a material other than the tellurium-base metallic optical material. The optical recording layer 112 may be formed of a material to which information is written and from which information is reproduced by a light beam, such as a laser beam emitted by a semiconductor laser, and in which a photochemical reaction as a recording mechanism takes place, what they call a heat mode recording material which generates heat upon absorption of light and carries out a recording mechanism or any other material, provided that the material is capable of changing its reproducing light reflecting and transmitting characteristics when information is written thereto and of enabling reading the information written thereto.

A hard coating layer 113 is formed over the outer surface of the first base plate 130 to protect the optical recording part 110 from being scratched and damaged. The hard coating layer 113 is formed of a UV-setting acrylic resin. The hard coating layer 113 may be formed of any other suitable material other than the UV-setting acrylic resin.

Conditions for the position of the IC module 120 in the optical card 100 with a built-in IC module will further be described with reference to FIGS. 2A and 2B.

Figure 2A:
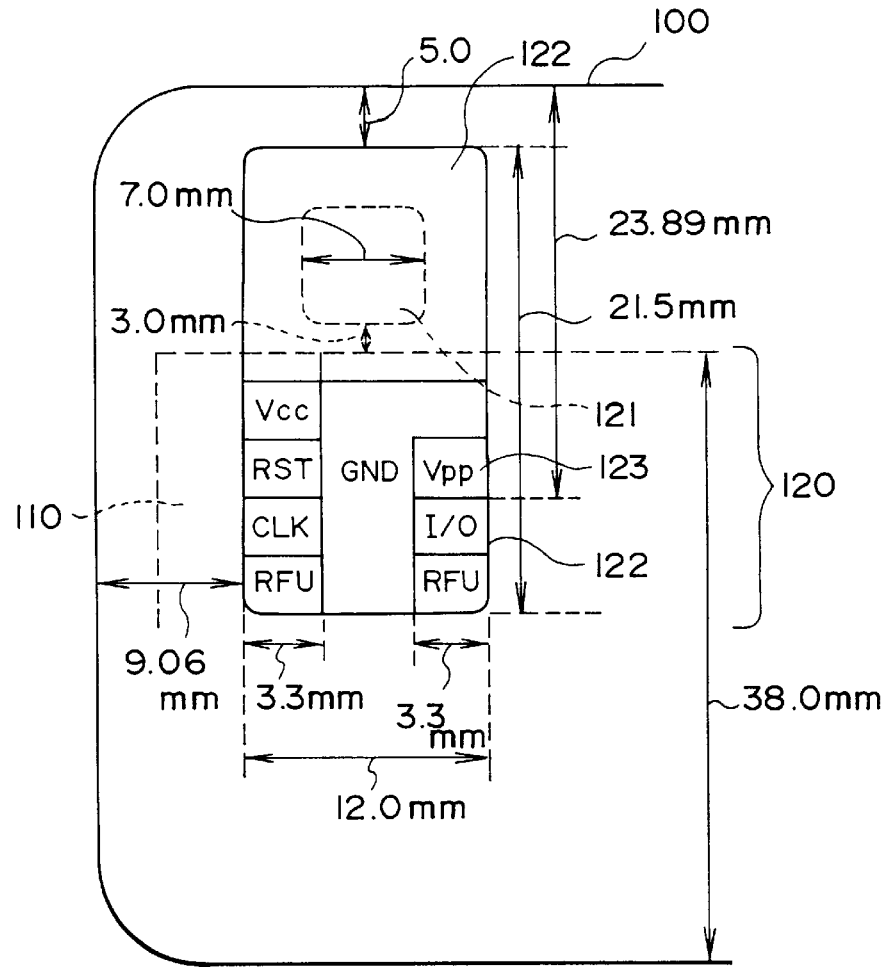
FIG. 2A is a plan view showing the disposition of an IC module.

FIG. 2A illustrates the position of the terminal part 123 and that of the IC chip unit 121 including the sealing resin molding 121b with respect to the upper and the left side of the optical card 100 with a built-in IC module. In FIG. 2A, numerical values indicates lengths in millimeter, and broken lines indicate the upper and the left end of the optical recording part 110.

As shown in FIG. 2A, the terminals to be connected to an external circuit (read/write device), not shown, including the $V_{cc}$, RST, CLK and I/O terminals of the terminal part 123 are arranged in a terminal region meeting requirements specified in ISO Standards (ISO 7816-2). The IC chip unit 121 including the sealing resin molding 121*b* is disposed in an upper region of the optical card 100 spaced from the terminal part 123, i.e., a region outside the terminal region specified in ISO Standards.

The upper end of the optical recording part 110 lies on the side of the upper side of the optical card 100 relative to the terminal part 123, and the optical recording part 110 extends to a region including the terminal region specified in ISO Standards.

Figure 2B:
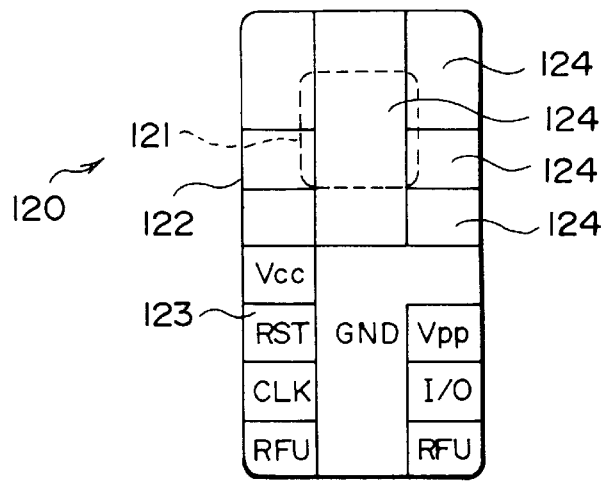
FIG. 2B is a plan view of an IC module provided with a dummy terminal.

As shown in FIGS. 1C and 2B, dummy terminals 124 may be formed on the surface of the base on which the terminal part 123 is formed, adjacent to the terminal part and in connection with the IC chip unit 121. If the IC card 100 is provided with the dummy terminals 124, the terminal part 123 and the dummy terminals 124 make the outer surface of the optical card 100 uniform and improve the design of the optical card 100.

In this optical card 100 with built-in IC module, the first base plate, the second base plate 140 and the optical recording part 110 may be the same as those of the conventional optical card with a built-in IC module, and the IC module 120 may be fabricated by using the conventional materials.

A method of fabricating the optical card 100 with built-in IC module will briefly be described with reference to FIG. 3.

First, the first base plate 130 is made, and then a rugged recess 111 having a rugged bottom surface is formed in a predetermined pattern in a first surface of the first base plate 130 by a known process, such as a 2P process, a casting process or an injection process. A region corresponding to the rugged recess 111 is the optical memory region 111*a* (FIG. 3(*a*)).

Subsequently, a second surface of the first base plate 130 opposite the first surface in which the rugged recess 111 is formed is coated entirely with the hard coating layer 113, and then the optical recording part 112 is formed in the rugged recess 111 (FIG. 3(*b*)).

Figure 3:
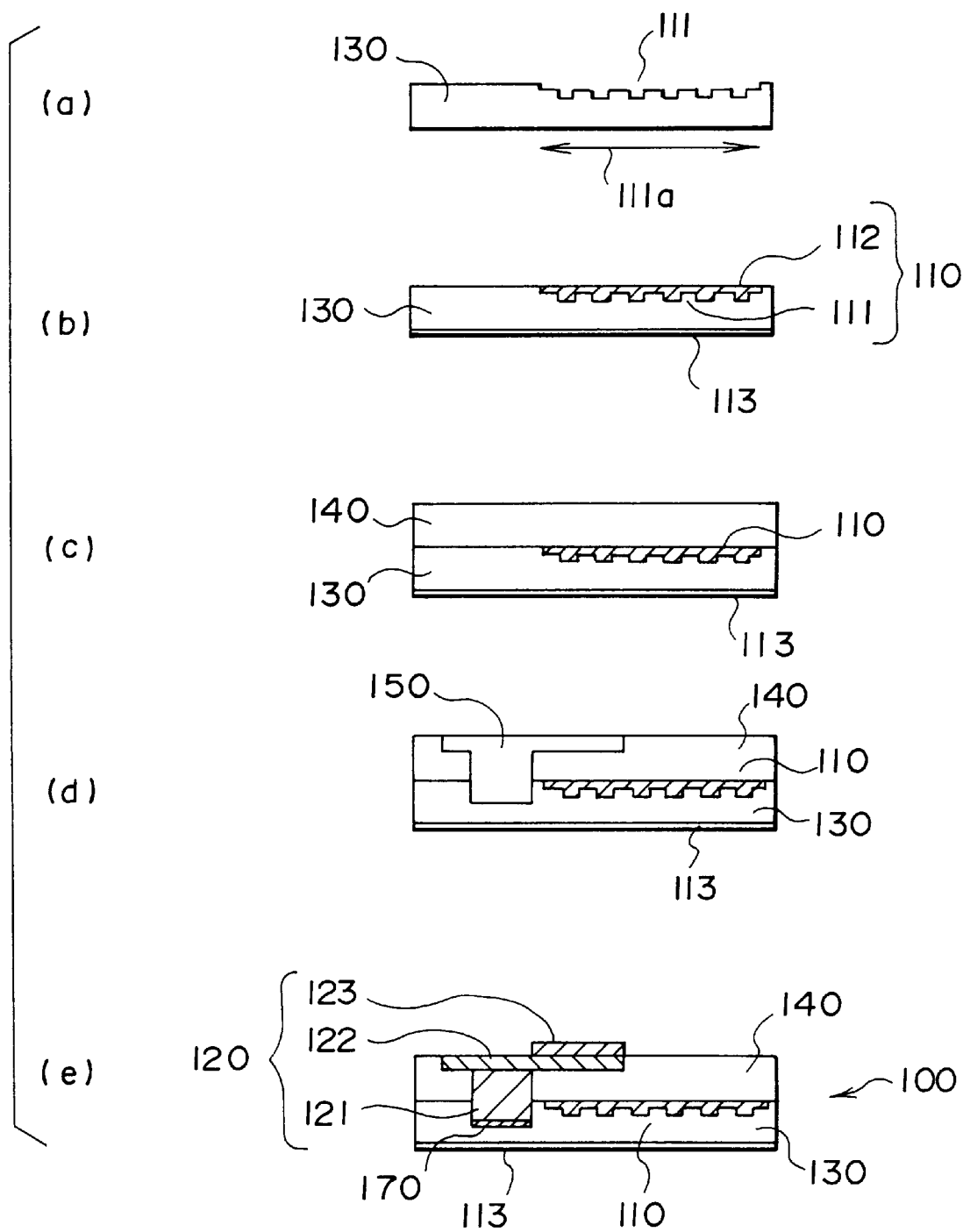
FIG. 3 is a schematic sectional view of assistance in explaining a manufacturing process for manufacturing an optical card with a built-in IC module.

Then, the second base plate 140 is bonded to the first base plate 130 (FIG. 3(*c*)).

Then, a recess 150 for accommodating the IC module 120 is formed through the second base plate 140 into the first base plate 130 by machining or the like (FIG. 3(*d*)).

Then, the IC module 120 is inserted in the recess 150 to complete the optical card 100 with built-in IC module (FIG. 3(*e*)).

The optical card 100 with a built-in IC module has a large storage capacity and is capable of being applied to uses requiring a large storage capacity. For example, an optical card applied to recording results of health examination needs to record image information as well as numerical information, which requires a large storage capacity as large as several megabytes. The optical card 100 with a built-in IC module of the present invention is applicable to recording such a large quantity of information. Since the optical card 100 with a built-in IC module of the present invention has the terminal part 123 disposed in a terminal region specified in ISO Standards, and has the base card 101 of a thickness in the range of 0.76±0.08 mm specified in ISO Standards and the optical recording part 110 has an increased area, information can be written to and read from the optical card 100 of the present invention by a read/write device employed in writing information to and reading information from the conventional optical card 100.

Although the IC chip unit 121 and the terminal par 123 are disposed on the opposite surfaces of the base 122 in regions other than those corresponding to each other in this embodiment, the terminal part 123 may be formed all over the surface of the base 122, and the IC chip unit 121 may be disposed in a portion of a region corresponding to the terminal part 123. For example, the IC chip unit 121 may be disposed in a left-hand region of the inner surface of the base 122, and the terminal part 123 may be formed all over the outer surface of the base 122, i.e., a region in which the terminal part 123 and the dummy terminals 124 are formed as shown in FIG. 1C. When the terminal part 123 is thus formed, the terminal part 123 takes an area greater than that taken by the IC chip unit 121, and the ratio in length between the longest side of the terminal part 123 and that of the IC chip 121 is in the range of 2:1 to 5:1.

The back surface of the IC chip part 121 of the IC module 120 may be coated with a covering layer 170 of substantially the same color as that of the second base plate 140 as shown in FIG. 1C. As mentioned above, the card base 101 of the optical card 100 with a built-in IC module has the first base plate 130 on the side of the optical recording part 110, and the second base plate 140 on the side of the terminal part 123, the first base plate 130 is made of a transparent polycarbonate resin or the like, and the second base plate 140 is made of a milky-white polyvinyl chloride resin or the like. When the optical card 100 with a built-in IC module is viewed from the side of the transparent first base plate 130, the back surface of the IC chip unit 121 of the IC module 120 may look as if the back surface is spaced from the second base plate 140. If the back surface of the IC chip unit 121 is coated with the coating layer 170 of substantially the same color as that of the second base plate 140, the back surface of the IC chip unit 121 can be hidden in the second base plate 140. The covering layer 170 may be a milky-white ink layer printed on the back surface of the IC chip unit 121 or a milky-white film applied to the back surface of the IC chip unit 121. The covering layer 170 may be provided with a decorative pattern.

The IC chip unit 121 has the IC chip 121*a* and the sealing resin molding 121*b*. The sealing resin molding 121*b* may be formed of a resin of the same color as that of the second base plate 140 instead of forming the covering layer 170 on the back surface of the IC chip unit 121.

Second Embodiment

An optical card with a built-in IC module in a second embodiment according to the present invention will be described with reference to FIGS. 5A to 8. In the second embodiment shown in FIGS. 5A to 8, a base 122 of an IC module 120 is disposed in a region corresponding to an optical recording part 110, and a pair of opposite edges 122*a* and 122*b* of the base 122 lie outside a region corresponding to the optical recording part 110. The optical card 100 in the second embodiment is substantially the same in construction as the optical card 100 in the first embodiment shown in FIGS. 1A to 4B in other respects.

In FIGS. 5A to 8 showing the second embodiment, parts like or corresponding to those of the first embodiment shown in FIGS. 1A to 4B are designated by the same reference numerals and the description thereof will be omitted.

Figure 5A:
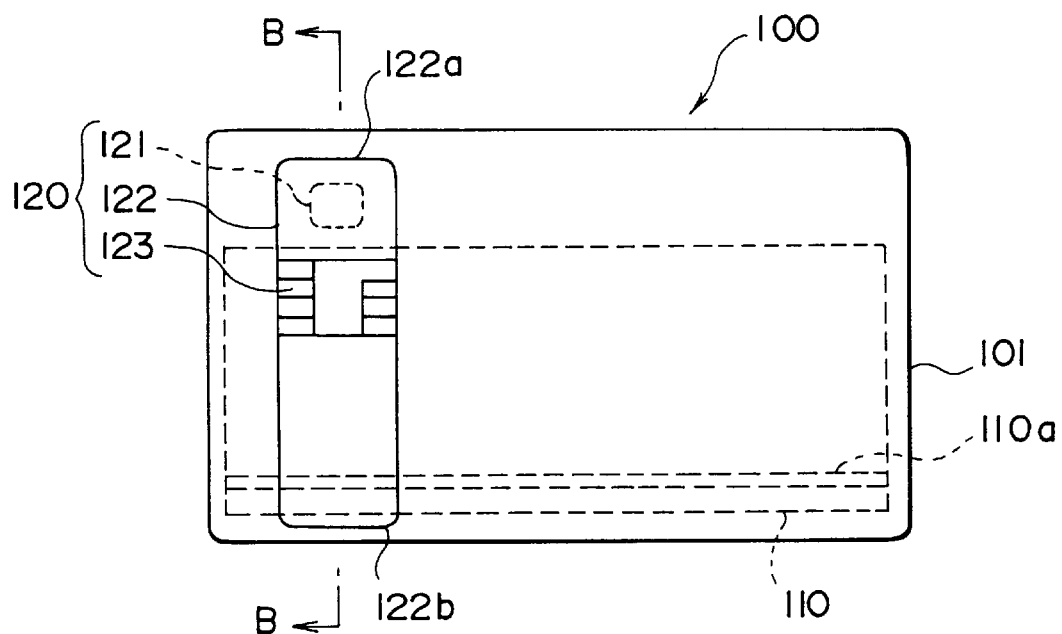
FIG. 5A is a plan view of an optical card with a built-in IC module in a second embodiment according to the present invention.
Figure 5B:
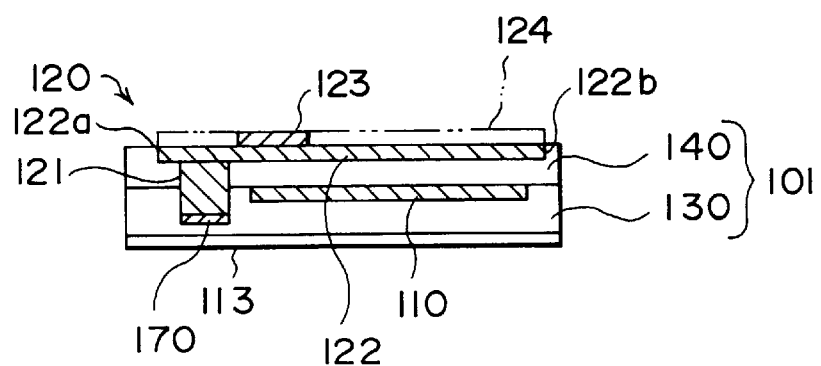
FIG. 5B is a sectional view taken on line B—B in FIG. 5A.

Referring to FIGS. 5A and 5B, the optical card 100 with built-in IC module has a base card 101 having a first base plate 130 and a second base plate 140, and an optical recording part 110 is formed in the base card 101.

The IC module 120 having a base 122 and an IC chip unit 121 formed on a first surface of the base 122 and provided with a memory and a CPU is incorporated into the base card 101. The IC module 120 further has a terminal part 123 formed on a second surface of the base 122. The terminal part 123 is disposed at a predetermined position on the front surface of the optical card 100, i.e., at a position is a terminal region specified in ISO Standards (ISO 7816-2), so that the terminals of the terminal part 123 can be connected to an external circuit (read/write device). The IC chip unit 121 including a sealing resin molding 121b is disposed in a region on the side of the upper side of the optical card 100 and spaced from the terminal part 123 (FIG. 5A). The optical recording part 110 is disposed in a region including the terminal part 123 and not including the IC chip unit 121.

The base 122 of the IC module 120 overlaps a region corresponding to the optical recording part 110 and extends beyond the boundary of the optical recording part 110. A pair of opposite edges 122a and 122b of the base 122 lie outside the region corresponding to the optical recording part 110.

Thus, the IC chip 121 of the IC module 120 is spaced from the terminal part 123. As shown in FIG. 5B, the IC chip unit 121 does not overlap the optical recording part 110. The thickness of the base card 101 having the first base plate 130 and the second base plate 140 is not different from that of the base card of the conventional optical card and in the range of 0.76(0.08 mm specified in ISO Standards and the optical recording part 110 extends to the terminal region specified in ISO Standards.

In the IC module 120 of the conventional optical card with a built-in IC module, the IC chip 121 including the sealing resin molding 121b is formed in a region for the terminal part 123. Therefore, the optical recording part 110 and the IC chip unit 121 overlap each other if the optical recording part 110 is extends to the terminal part 123 and, consequently, the thickness of the base card 101 will exceed the upper limit of a thickness range specified in ISO Standards and hence the optical card cannot be handled by a read/write device conforming to the requirements of ISO Standards. However, the optical card 100 with a built-in IC module of the present invention can be handled by a read/write device conforming to the requirements of ISO Standards.

Figure 6:
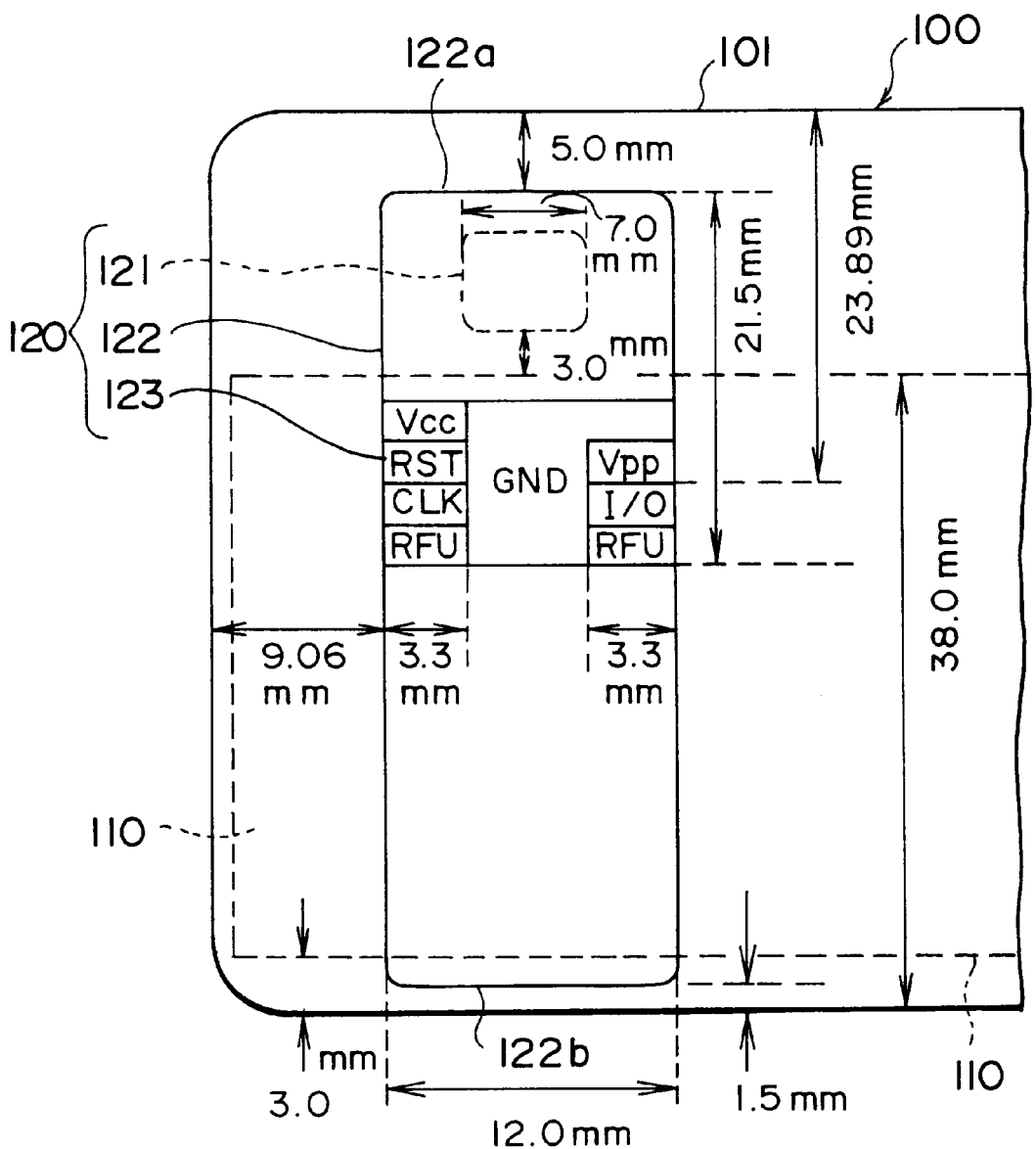
FIG. 6 is a plan view showing the disposition of an IC module.

FIG. 6 shows the position of the IC module 120 in the optical card 100 with a built-in IC module. In FIG. 6, the optical recording part 110 is indicated by broken lines, and numerical values indicates lengths in millimeter. As shown in FIG. 6, the terminals to be connected to an external circuit (read/write device), not shown, including $V_{cc}$, RST, CLK and I/O lines of the terminal part 123 are arranged in a terminal region meeting requirements specified in ISO Standards (ISO 7816-2). The IC chip unit 121 is disposed in an upper region of the optical card 100 spaced from the terminal part 123, i.e., a region outside the terminal region specified in ISO Standards. The upper end of the optical recording part 110 lies on the upper side of the optical card 100 relative to the terminal part 123, and the optical recording part 110 extends to a region including the terminal region specified in ISO Standards. As shown in FIGS. 5A, 5B and 6, the base 122 of the IC module 120 extends beyond a region corresponding to the optical recording part 110, and a pair of opposite edges 122a and 122b of the base 122 lie outside the region corresponding to the optical recording part 110.

The optical recording part 110 is provided with tracks 110a extending in a transverse direction as viewed in FIG. 5A, and a pair of edges 122a and 122b are substantially parallel to the tracks 110a.

Generally, stress is concentrated on portions of the base card 101 in the vicinity of the edges 122a and 122b of the base 122 when the optical card 100 is bent. However, the optical recording part 110 is not damaged or distorted by stress concentrated on portions in the vicinity of the edges 122a and 122b when the optical card 100 is bent because the edges 122a and 122b are outside the region corresponding to the optical recording part 110.

Figure 7:
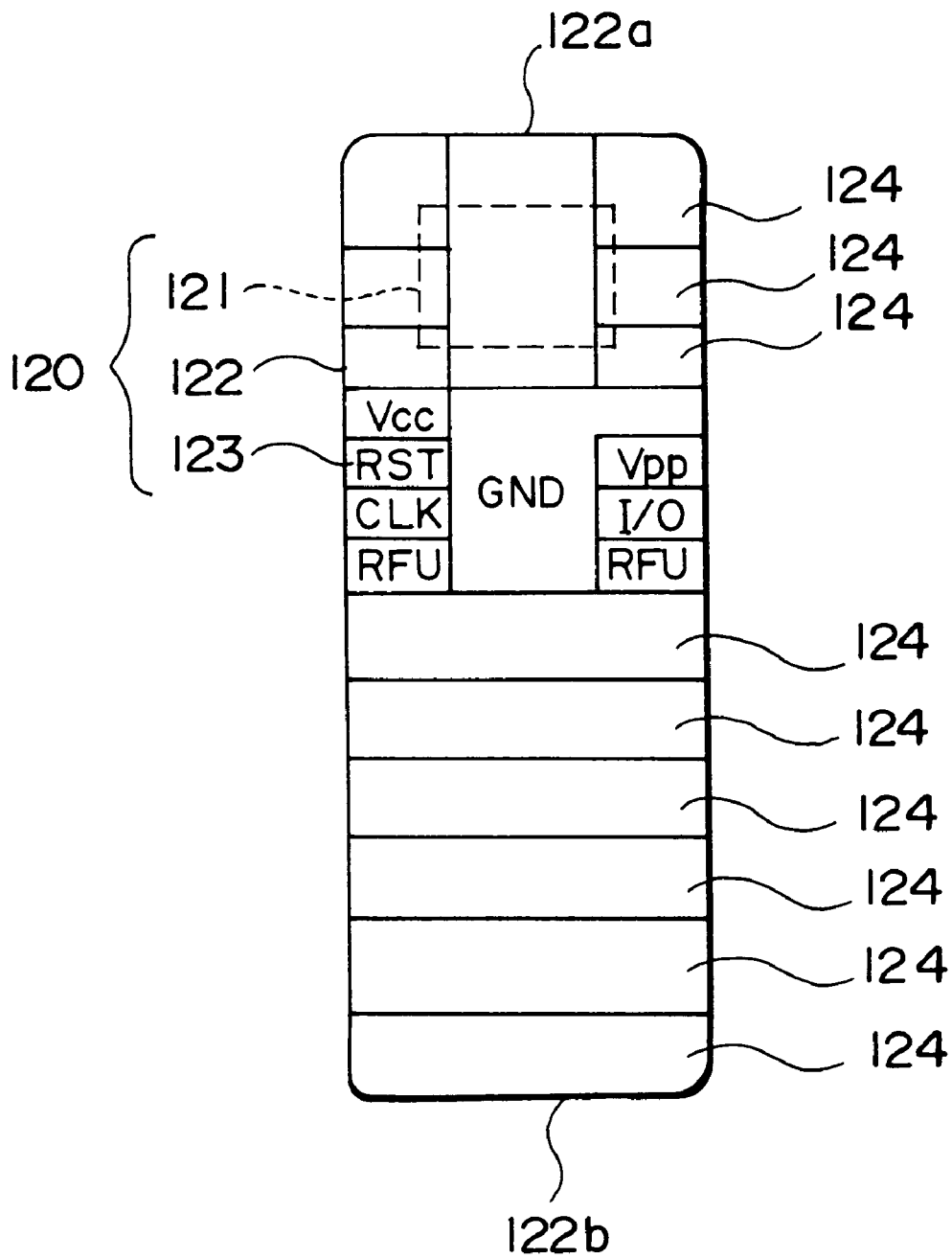
FIG. 7 is a plan view of an IC module having a dummy terminal.

Dummy terminals 124 may be formed contiguously with the terminal part 123 as shown in FIGS. 5B and 7 on the surface of the base 122 in which the terminal part 123 is formed. If the terminal part 123 and the dummy terminals 124 are formed all over a region between the pair of edges 122a and 122b of the base 122, the surface of the optical card 100 looks even and the design of the optical card 100 is improved. The terminal part 123 may be formed so as to take the all over a region between the pair of edges 122a and 122b of the base 122.

In this optical card 100 with a built-in IC module, the first base plate 130, the second base plate 140 and the optical recording part 110 may be the same as those of the conventional optical card with a built-in IC module, and the IC module 120 may be a resin encapsulated package fabricated by using the conventional materials. When thus fabricating the IC module 120, only the length of the base 122 needs to be changed.

Figure 8:
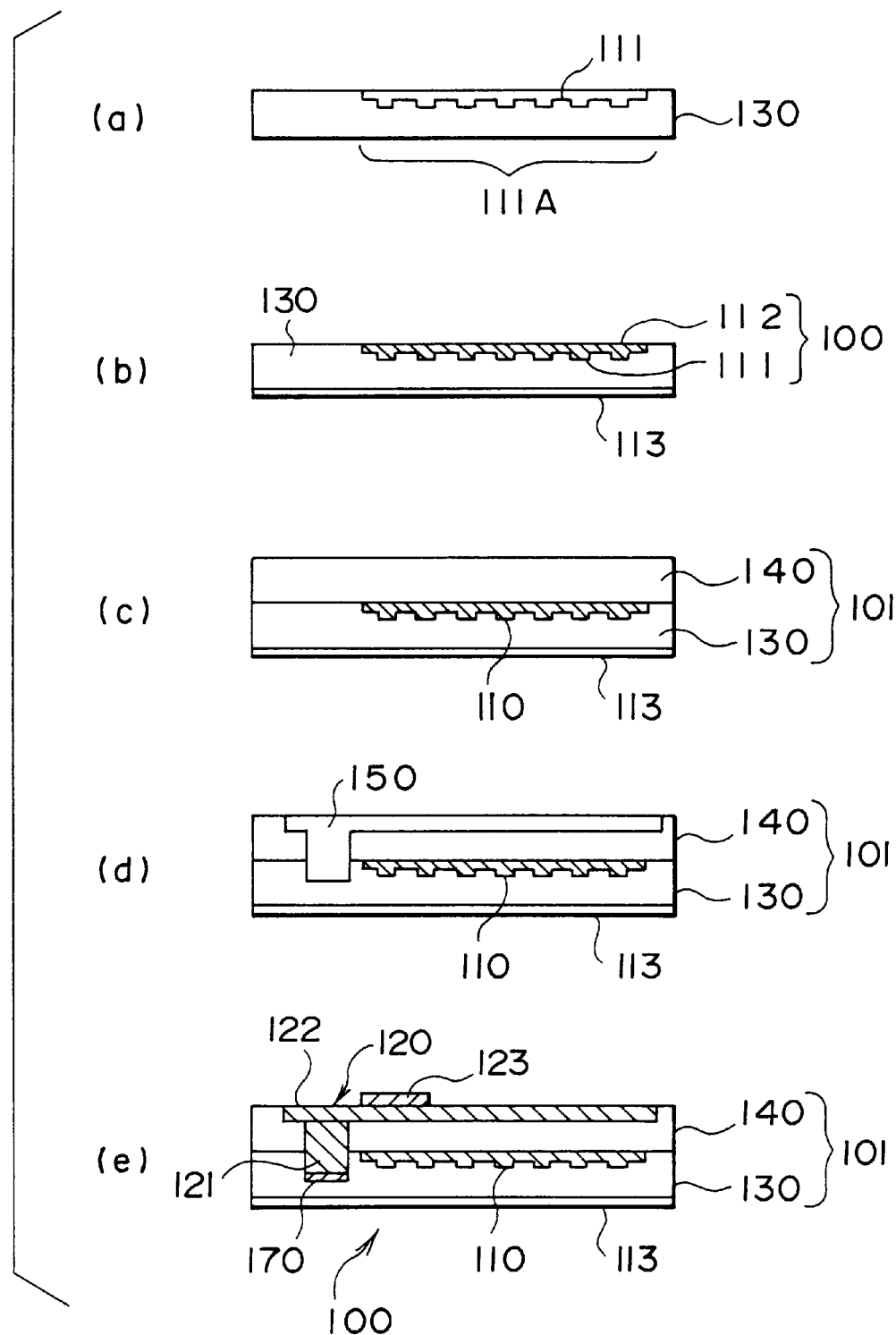
FIG. 8 is a schematic sectional view of assistance in explaining a manufacturing process for manufacturing an optical card with a built-in IC module.

A method of fabricating the optical card 100 with a built-in IC module will briefly be described with reference to FIG. 8.

First, the first base plate 130 is made, and then a rugged recess 111 having a rugged bottom surface is formed in a predetermined pattern in a first surface of the first base plate 130 by a known process, such as a 2P process, a casting process or an injection process (FIG. 8(a)). A region corresponding to the rugged recess 111 is the optical memory region 111a (FIG. 8(a)).

Subsequently, a second surface of the first base plate 130 opposite the first surface in which the rugged recess 111 is formed is coated entirely with the hard coating layer 113, and then the optical recording part 112 is formed in the rugged recess 111 (FIG. 8(b)).

Then, the second base plate 140 is bonded to the first base plate 130 (FIG. 8(c)). Then, a recess 150 for accommodating the IC module 120 is formed through the second base plate 140 into the first base plate 130 by machining or the like (FIG. 8(d)). Then, the IC module 120 is inserted in the recess 150 to complete the optical card 100 with built-in IC module (FIG. 8(e)).

The first base plate 130 is made of a polycarbonate resin. The thickness of a portion of the first base plate 130 corresponding to an optical memory region 111a needs to be in the range of 0.4±0.05 mm, the first base plate 130 needs to be free from optical strain and needs to have a transmittance of 95% or above to light radiations of a wavelength in the range of 750 to 850 nm. Suitable materials other than the polycarbonate resin for forming the first base plate 130 are polystyrene resins, amorphous polyolefin resins, polyester resins, acrylic resins, polyvinyl chloride resins, epoxy resins and such. The second base plate 140 is made of a polyvinyl chloride resin. Suitable materials other than the polyvinyl chloride resin for forming the second base plate 140 are ABS resins, polycarbonate resins and such.

The optical recording part 110 is formed by covering the rugged recess 111 having a rugged bottom surface with an optical recording layer 112 of a tellurium-base metallic optical recording material. The optical recording layer 112 may be formed of a material other than the tellurium-base metallic optical material. The optical recording layer 112 may be formed of a material to which information is written and from which information is reproduced by a light beam, such as a laser beam emitted by a semiconductor laser, and in which a photochemical reaction as a recording mechanism takes place, what they call a heat mode recording material which generates heat upon absorption of light and carries out a recording mechanism or any other material, provided that the material is capable of changing its reproducing light reflecting and transmitting characteristics when information is written thereto and of enabling reading the information written thereto.

A hard coating layer 113 protects the optical recording part 110 from being scratched and damaged. The hard coating layer 113 is formed of a UV-setting acrylic resin.

The optical card 100 with a built-in IC module is provided with the optical recording part 110 having a large storage capacity and is capable of being applied to uses requiring a large storage capacity. For example, an optical card applied to recording results of health examination needs to record image information as well as numerical information, which requires a large storage capacity as large as several megabytes. The optical card 100 with a built-in IC module of the present invention is applicable to recording such a large quantity of information. Since the optical card 100 with a built-in IC module of the present invention has the terminal part 123 of the IC module 120, disposed in a terminal region specified in ISO Standards, and has the base card 101 of a thickness in the range of 0.76±0.08 mm specified in ISO Standards and the optical recording part 110 has an increased area, information can be written to and read from the optical card 100 of the present invention by a read/write device employed in writing information to and reading information from the conventional optical card 100.

Since the base 122 bearing the terminal part 123 of the IC module 120 extends beyond the boundary of the optical recording part 110, cracks formed when the optical card 100 is bent will not develop into the optical recording part 110 and the optical card 100 is highly resistant to bending.

Third Embodiment

An optical card with a built-in IC module in a third embodiment according to the present invention will be described hereinafter with reference to FIGS. 9A to 10. In the third embodiment shown in FIGS. 9A to 10, a base 122 included in an IC module 120 is disposed in a region corresponding to an optical recording part 110, and a pair of opposite edges 122a and 122b of the base 122 are formed in shapes different from those of the optical cards 100 in the foregoing embodiments. The optical card 100 in the third embodiment is substantially the same in construction as the optical card 100 in the first embodiment shown in FIGS. 1A to 4B in other respects.

Figure 9A:
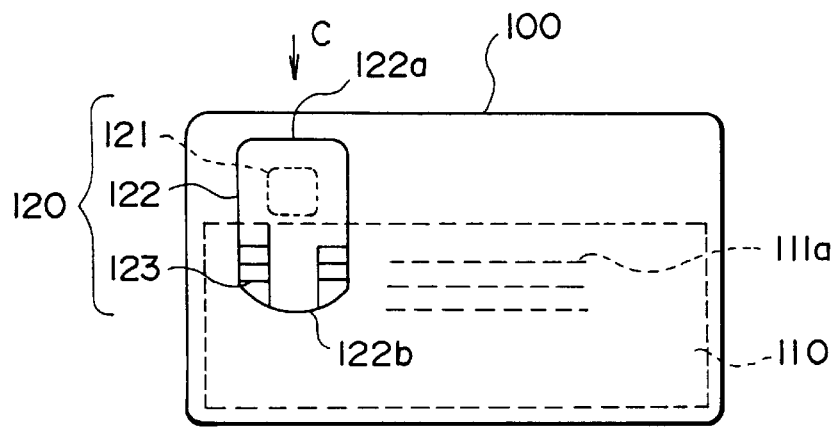
FIG. 9A is a plan view of an optical card with a built-in IC module in a third embodiment according to the present invention.
Figure 9B:
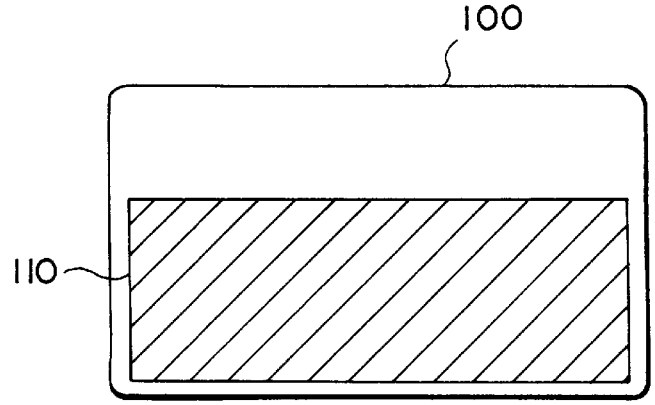
FIG. 9B is a rear view of the optical card with a built-in IC module of FIG. 9A.
Figure 9C:
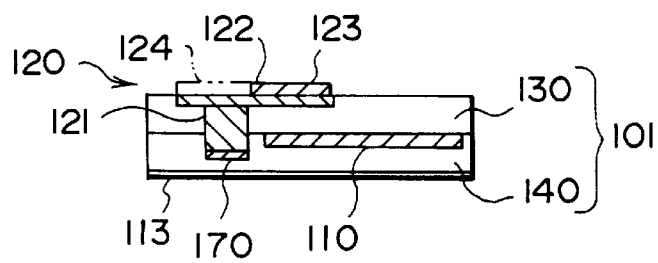
FIG. 9C is a sectional view taken on line C—C in FIG. 9A.
Figure 10:
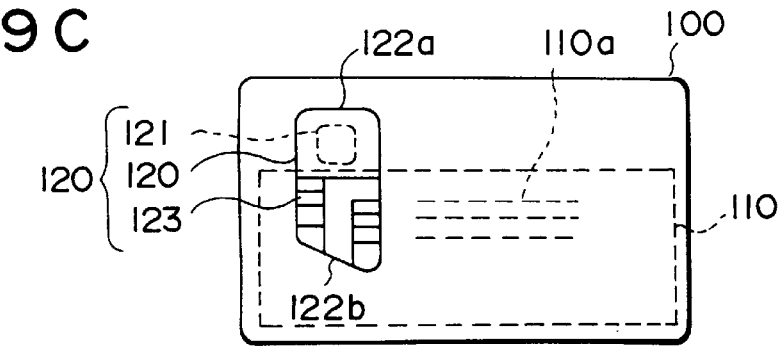
FIG. 10 is a plan view of an optical card with a built-in IC module in a modified embodiment according to the present invention.

In FIGS. 9A to 10 showing the third embodiment, parts like or corresponding to those of the first embodiment shown in FIGS. 1A to 4B are designated by the same reference characters and the description thereof will be omitted.

Referring to FIGS. 9A to 9C, the optical card 100 with a built-in IC module has a base card 101 having a first base plate 130 and a second base plate 140, and an optical recording part 110 and an IC module 120 are incorporated into the base card 101. The IC module 120 has a base 122, an IC chip unit 121 formed on a first surface of the base 122, and an terminal part 123 formed on a second surface of the base 122. An IC chip 121 included in the IC module 120 is disposed in a region other than a region in which the optical recording part 110 is formed, and the terminal part 123 is disposed in the region in which the optical recording part 110 is formed.

The base 122 of the IC module 120 is disposed so as to overlap a region corresponding to the optical recording part 110. The base 122 has and edge 122a lying outside the region in which the optical recording part 110 is formed, and an edge 122b lying in the region in which the optical recording part 110 is formed.

The optical recording part 110 is provided with tracks 110a extending in a transverse direction as viewed in FIG. 9A, and the edges 122a is substantially parallel to the tracks 110a. The edge 122b of the base 122 extends curvilinearly in the region in which the optical recording part 110 is formed. Thus, the optical recording part 110 will not be damaged even if stress is concentrated in a portion of the card base 101 in the vicinity of the edge 122a of the base 122 when the optical card 100 is bent. Since the 122b of the base 122 has a curvilinear shape and is not parallel to the tracks 110a of the optical recording part 110, the optical recording part 110 will not be damaged even if stress is concentrated on a portion of the base card 101 corresponding to the edge 122b of the base 122.

In FIGS. 9A to 9C, the terminal part 123 of the IC module 120 is disposed on the side of the optical recording part 110 (on the side of the edge 122b) on the base 122, and the IC chip unit 121 is disposed on the base 122 in a region opposite a region on the side of the optical recording part 110 (in a region on the side of the edge 122a). Dummy terminals 124 may be formed contiguously with the terminal part 123 on the surface of the base 122 in which the terminal part 123 is formed. The dummy terminals 124 may be formed along the edge 122b of the base 122 on the side of the optical recording part 110.

In modification, the edge 122b of the base 122 may extend linearly at a predetermined inclination to the direction in which the tracks 110a of the optical recording part 110 extend as shown in FIG. 10.

The curved shape of the edge 122b of the base 122 may be a section of a circle, a section of an ellipse, a curve expressed by a trigonometric function or a curve expressed by a high-order function.

We claim:

1. An optical card with a built-in IC module, comprising:
   a base card;
   an optical recording part mounted on the base card; and
   an IC module mounted on the base card;
   wherein the IC module includes a base, an IC chip unit attached to the base, and a terminal part attached to the base, and the terminal part of the IC module is exposed to the outside of the card, the optical recording part is located on a plane different from a plane in which the terminal part is located, at least a part of the terminal part is located in a region of the base card corresponding to that of the optical recording part, and the IC chip unit is located in a region of the base card other than a region in which the optical recording part is located.

2. The optical card of claim 1, wherein
   a dummy terminal is formed contiguously with the terminal part on the base.

3. The optical card of claim 1, wherein
   the IC chip unit and the terminal part of the IC module are located substantially symmetrically with respect to the middle of the base.

4. The optical card of claim 1, wherein
   the area of the terminal part of the IC module is greater than that of the IC chip unit, and the IC chip unit is located in a region corresponding to the terminal part.

5. The optical card of claim 4, wherein the ratio in length between the longest side of-the terminal part and that of the IC chip unit is in the range of 2:1 to 5:1.

6. The optical card of claim 1, wherein the base of the IC module overlaps a region corresponding to the optical recording part, and a pair of opposite end edges of the base of the IC module lie outside a region corresponding to the optical recording part.

7. The optical card of claim 6, wherein the optical recording part includes tracks formed therein, and said pair of opposite edges of the base extend parallel to the tracks in the optical recording part.

8. The optical card of claim 6, wherein the terminal part is formed over a region between the pair of opposite edges of the base.

9. The optical card of claim 6, wherein the terminal part and a dummy terminal are formed over a region between the pair of opposite edges of the base.

10. The optical card of claim 1, wherein the optical recording part includes tracks formed therein, and the base of the IC module overlaps a region corresponding to the optical recording part, an edge of the base extends linearly in a region corresponding to the optical recording part at a predetermined inclination to a direction in which tracks of the optical recording part extend.

11. The optical card of claim 10, wherein said terminal part or a dummy terminal is formed near the edge of the base extending linearly at a predetermined inclination to a direction in which the tracks of the optical recording part extends.

12. The optical card of claim 1, wherein the base of the IC module overlaps a region corresponding to the optical recording part, an edge of the base of the IC module extends curvilinearly in a region corresponding to the optical recording part.

13. The optical card of claim 12, wherein said terminal part or a dummy terminal is formed near the curvilinear edge of the base.

14. The optical card of claim 1, wherein the base card includes a base plate for the terminal part, and a base plate for the optical recording part, and a covering layer for the terminal part is formed on the back surface of the IC chip unit of the IC module.

15. The optical card of claim 1, wherein the base card includes a base plate for the terminal part, and a base plate for the optical recording part, and the IC chip unit of the IC module includes an IC chip and a sealing resin molding for encapsulating the IC chip therein.

\* \* \* \* \*

UNITED STATES PATENT AND TRADEMARK OFFICE
CERTIFICATE OF CORRECTION

PATENT NO. : 5,932,866
DATED : August 3, 1999
INVENTOR(S) : Yosuke TERADA et al.

It is certified that error appears in the above-indentified patent and that said Letters Patent is hereby corrected as shown below:

Column 1, line 2 and On the title page [54] delete "TECHNICAL FIELD".

Signed and Sealed this

Eighth Day of February, 2000

Attest:

Q. TODD DICKINSON

Attesting Officer

Commissioner of Patents and Trademarks